United States Patent
Keeli et al.

(10) Patent No.: US 9,183,327 B2
(45) Date of Patent: Nov. 10, 2015

(54) USE OF SECOND BATTERY LIFE TO REDUCE CO2 EMISSIONS

(71) Applicant: NEC Laboratories America, Inc., Princeton, NJ (US)

(72) Inventors: Anupama Keeli, Santa Clara, CA (US); Ratnesh Sharma, Fremont, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 459 days.

(21) Appl. No.: 13/764,100

(22) Filed: Feb. 11, 2013

(65) Prior Publication Data
US 2013/0211799 A1    Aug. 15, 2013

Related U.S. Application Data

(60) Provisional application No. 61/597,213, filed on Feb. 10, 2012, provisional application No. 61/598,555, filed on Feb. 14, 2012.

(51) Int. Cl.
| | |
|---|---|
| G06F 7/60 | (2006.01) |
| G06F 17/10 | (2006.01) |
| G06F 17/50 | (2006.01) |
| H01M 10/44 | (2006.01) |
| H01M 10/48 | (2006.01) |

(52) U.S. Cl.
CPC ........... *G06F 17/5009* (2013.01); *H01M 10/44* (2013.01); *H01M 10/48* (2013.01); *G06F 2217/10* (2013.01); *G06F 2217/78* (2013.01); *Y02E 40/76* (2013.01); *Y02E 60/76* (2013.01); *Y04S 10/545* (2013.01); *Y04S 40/22* (2013.01)

(58) Field of Classification Search
CPC ........... G06F 17/5018; G06F 17/5036; G06F 17/5009; G06F 2217/16; G05B 17/02
USPC ......................................................... 703/2
See application file for complete search history.

(56) References Cited

U.S. PATENT DOCUMENTS

2008/0177345 A1 *   7/2008   Schmidt et al. .............. 607/29

\* cited by examiner

*Primary Examiner* — Saif Alhija
(74) *Attorney, Agent, or Firm* — Juseph Kolodka

(57) ABSTRACT

A method for determining use of a second life battery under load conditions to reduce CO2 emissions includes using Monte Carlo simulations to modeling uncertainties of a load profile, a renewable energy profile, and CO2 emissions rate, determining an initial state of charge SOC of the second life battery based on a Gaussian distribution for determining a rate of charging during low emission hours and discharging during high CO2 emission hours of the second life battery and storage size of the second life battery and CO2 emissions reduction.

7 Claims, 2 Drawing Sheets

USE OF SECOND BATTERY LIFE TO REDUCE CO2 EMISSIONS

RELATED APPLICATION INFORMATION

This application claims priority to provisional application Nos. 61/597,213 filed Feb. 10, 2012 and 61/598,555 filed Feb. 14, 2012, the contents thereof are incorporated herein by reference

BACKGROUND OF THE INVENTION

The present invention relates generally to battery technology, and more particularly, to use of second battery life to reduce CO2 emissions.

Batteries used in electric vehicles cannot be used in the vehicle once the battery capacity falls to 70%-80%. The remaining capacity of these batteries, referred to second life batteries, can be employed in various applications so that they can be kept out of landfills. One of the applications is to use the second life batteries to reduce carbon dioxide (CO2) emissions from the grid. The CO2 emission profile varies depending on the time of the day, month and season. Emissions are high when only the base load plants are operating and low when renewable are used. We charge second life battery during the low emission hours of the day and discharge it when the emissions are high from the grid. With the increase in renewable generation such as photo voltaic, wind energy the carbon foot print changes with the hour of the day. The analysis is to optimize the use of second life battery to reduce the emissions considering uncertainties in the load and availability of renewable power.

Previous research addresses CO2 emissions reduction using hourly data of the emissions from the generators and different fuel types used. They compare the dollar amount saved by emissions avoided and peak demand reduced. However, this prior effort does not account for uncertainties in renewable energy prediction and an initial state of charge (SOC) of the second life battery as the invention does.

Prior works cover peak demand reduction vs. CO2 emission savings using stationary battery storage. One article discusses energy and emission analysis in particular focusing on the dollar value of the emissions avoided compared to the dollar value of the peak demand reduction.

In another prior work, Gaussian probability distribution is used for calculating the initial SOC of a second life battery when it is removed from the electric vehicle and is ready for second use. This process is unique in finding the range of state of charge (SOC) and the probability distribution of having a second life battery with a particular SOC. A similar procedure has been used to forecast errors for wind and load forecast errors.

Accordingly, there is a need for reducing CO2 emissions using a second life battery that takes into account availability of the zero emissions power that takes into account zero emission power uncertainties as well as load profile uncertainties.

BRIEF SUMMARY OF THE INVENTION

The present invention is directed to a method for determining use of a second life battery under load conditions to reduce CO2 emissions, said method including modeling uncertainties in a forecast of a load profile to which said second life battery is using a Monte Carlo simulation for a load profile, modeling uncertainties of a renewable energy profile which is zero emission power profile using a Monte Carlo simulation to forecast availability of the renewable energy at different points of a day to charge the second life battery, modeling uncertainties in CO2 emissions rate using a Monte Carlo simulation for a CO2 emissions profile, determining an initial state of charge SOC of the second life battery based on a Gaussian distribution, and using the load profile, CO2 emissions profile, renewable energy profile and modeled initial state of charge SOC of second battery life for determining a rate of charging during low emission hours and discharging during high CO2 emission hours of the second life battery, and determining storage size of the second life battery and CO2 emissions reduction.

These and other advantages of the invention will be apparent to those of ordinary skill in the art by reference to the following detailed description and the accompanying drawings.

DETAILED DESCRIPTION

The present invention is directed to a method for reducing CO2 emissions with the use of second life battery. Even though new batteries can be used in place of the second life battery, the present invention has a beneficial environmental impact from battery energy storage by utilizing the second life battery which otherwise would be a discarded in a landfill and increase environmental hazards. The unique aspects of the present invention include considering uncertainties in a forecast of load profile, renewable energy profile and CO2 emissions rate. Monte Carlo simulations are used for modeling the uncertainties. The second life battery initial capacity is unknown and knowing the capacity beforehand is important to size the storage requirements for the application it is being used. Gaussian distribution is used to model the uncertainties.

Figure 1:
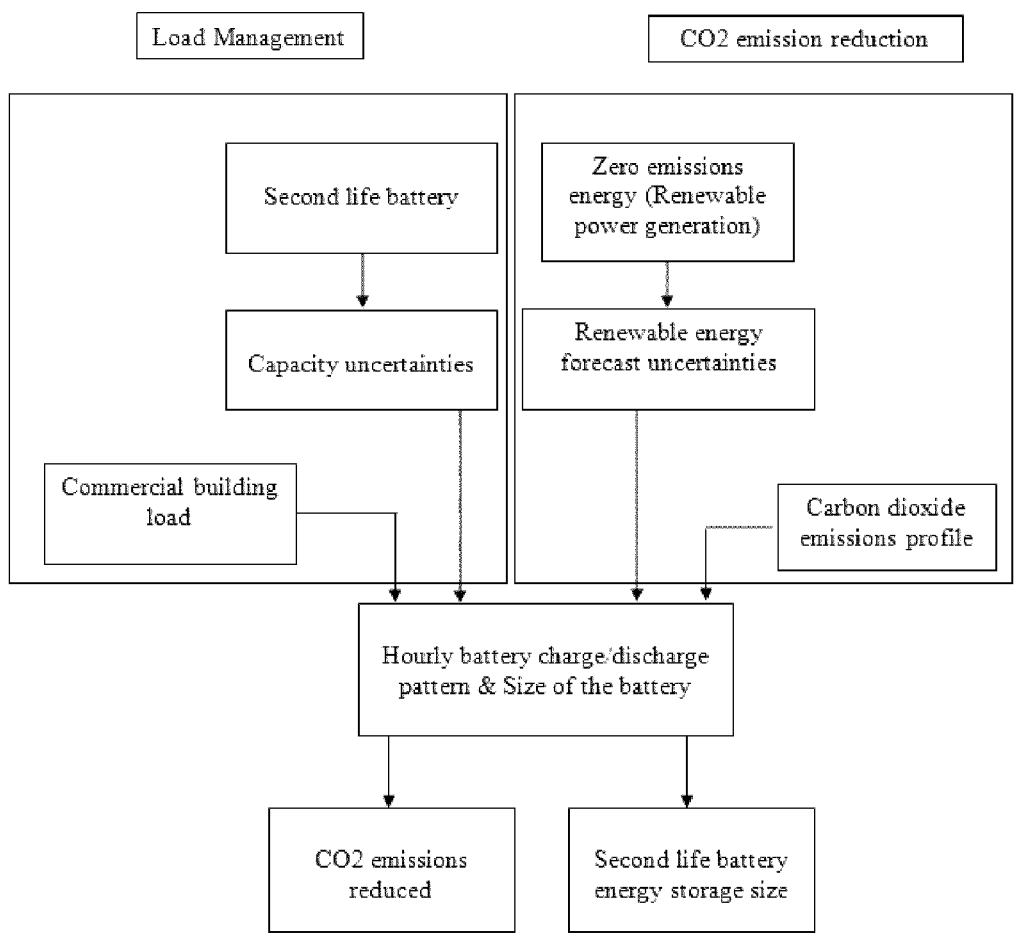
FIG. 1 is an overview block diagram showing aspects of load management and CO2 emission reduction, in accordance with the invention.

Turning now to the block diagram of FIG. 1, showing aspects of load management and CO2 emission reduction for configuring second life battery energy storage size and CO2 emission reduction, second life battery is factored into capacity uncertainties and commercial building load and zero emissions energy (renewable power generation) is factored into renewable energy forecast uncertainties. An Hourly battery charge/discharge pattern and battery size determination take into account commercial load need and capacity uncertainties and renewable energy forecast uncertainties is factored into determining CO2 emissions that are reduced and second life battery storage size.

Figure 2:
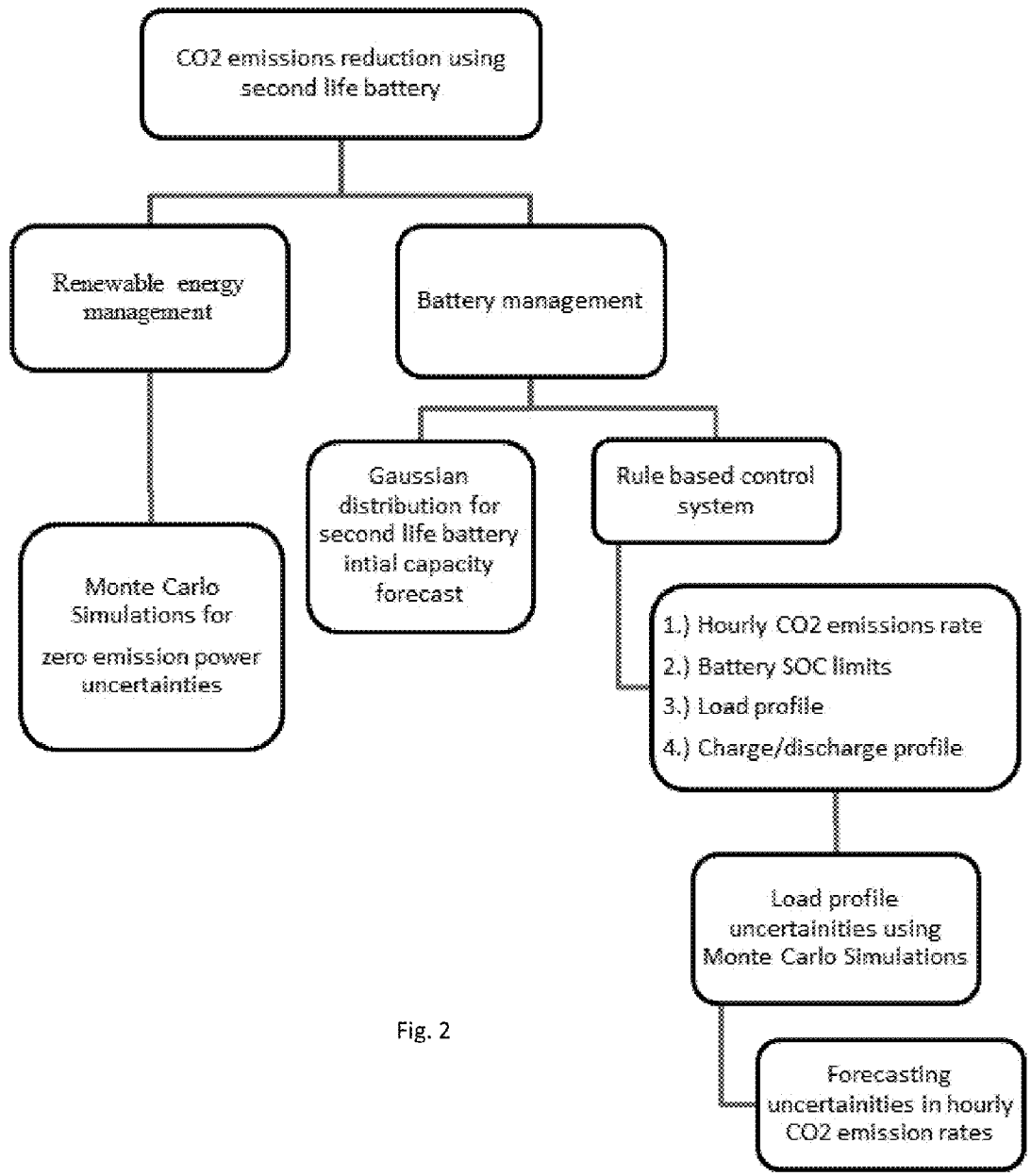
FIG. 2 is a block diagram showing keying aspects of CO2 emissions reduction using second life battery that takes into account uncertainties respecting zero emission power and load balancing, in accordance with the invention.

Referring now to the block diagram of FIG. 2, there are shown key aspects of the inventive CO2 emissions reduction using second battery life. The present CO2 emissions reduction using second battery life comprises renewable energy management and battery management aspects. The renewable energy management aspect entails Monte Carlo simulations to address zero emission power uncertainties. The battery management aspect comprises a Gaussian distribution for second life battery initial forecast capacity. The battery management also entails a rule based control system comprising hourly CO2 emissions rate, battery state of charge SOC limits, a load profile and a charge/discharge profile.

Load profile uncertainties are addressed using Monte Carlo simulations to aid in forecasting uncertainties in hourly CO2 emissions rates.

Respecting the Monte Carlo simulations for uncertainties in zero emission power, renewable sources of power, like wind and solar power are intermittent. Forecast uncertainties in the renewable power availability is modeled using Monte Carlo simulations. Following are the steps followed for simple Monte Carlo simulations:

Step 1: Set the value of the maximum iteration number 'n'
Step 2: Initialize n=1
Step 3: Define renewable hourly profile
Step 4: Define $D_L$ (Deviation in the load profile); $D_R$ (Deviation in the renewable power)
Step 5: Newrenewableprofile=renewables hourly profile+ $D_R$*random(1,1)   Newloadprofile=hourlyloadprofile+ $D_L$*random(1,1)

The output from the above Monte Carlo simulations would be a set of 'n' renewable energy profiles and load profiles. These simulated 'n' profiles account for uncertainties in the prediction of the renewable energy and load profile.

Similar Monte Carlo simulation steps are followed for modeling the uncertainties in forecasting the demand profiles and the CO2 emissions rate.

Respecting uncertainties in storage capacity forecast, determining the state of charge of a second life battery after its use in an electric vehicle is a difficult process. It varies for different vehicles' depending on the conditions the battery was used. Here we use Gaussian distribution to model the initial state of charge of the second life battery, which can be charged during low emission hours and discharged during high emission hours.

The rule based control aspect is used to size the second life battery to reduce the CO2 emissions depending on the renewable energy availability. The inputs to the system are:

1.) Hourly CO2 emission rates
2.) Load profile
3.) Zero emission power hourly profile The uncertainties in the availability of the renewable power, forecast of load profile and the CO2 emissions rates is modeled using Monte Carlo simulations. The initial state of charge of the second life batteries used for this application are determined based on the Gaussian distribution. Using these inputs the battery charge/discharge pattern is decided based on the rule-based control. Limits on the battery SOC and charge/discharge power are the limitations of the rule-based control.

From the foregoing it can be appreciated that the key features of inventive second life battery use includes the use of uncertainty models for calculation of second life battery storage requirement, rather than simple load forecasts, and initial state of charge SOC forecasts of the second life battery. Uncertainties in the forecast of the SOC of the second life battery are important because the batteries in electric vehicles are not subject to similar conditions. This helps in deciding the size and number of second life batteries required for a particular application. This inventive method enables how best a second life battery can be used for CO2 emissions reduction.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for determining use of a second life battery under load conditions to reduce CO2 emissions, said method comprising the steps of:
   modeling uncertainties in a forecast of a load profile to which said second life battery is using a Monte Carlo simulation for a load profile; modeling uncertainties of a renewable energy profile which is zero emission power profile using a Monte Carlo simulation to forecast availability of said renewable energy at different points of a day to charge said second life battery;
   modeling uncertainties in CO2 emissions rate using a Monte Carlo simulation for a CO2 emissions profile;
   determining an initial state of charge SOC of said second life battery based on a Gaussian distribution; and
   using said load profile, CO2 emissions profile, renewable energy profile and modeled initial state of charge SOC of second battery life for determining a rate of charging during low emission hours and discharging during high CO2 emission hours of said second life battery, and determining storage size of said second life battery and CO2 emissions reduce,
   wherein the method steps are performed by a processor.

2. The method of claim 1, wherein said Monte Carlo simulation for said renewable energy profile comprises a new renewable energy profile being based on a renewable energy hourly profile plus a deviation in renewable power influenced by a random factor.

3. The method of claim 1, wherein said Monte Carlo simulation for said renewable energy profile comprises an output of a set of load profiles accounting for uncertainties in predicting a zero emission profile.

4. The method of claim 1, wherein said Monte Carlo simulation for said renewable energy profile comprises an iteration based on defining a renewable hourly profile.

5. The method of claim 4, wherein said Monte Carlo simulation for said renewable energy profile comprises an iteration based on defining a deviation in said renewable hourly profile.

6. The method of claim 1, wherein determining said storage size of said second life battery comprises a rule based control to size said second life battery to reduce CO2 emissions depending on said renewable energy availability, said rule based control comprising inputs of hourly CO2 emissions rates, said load profile and an hourly profile of said zero emissions profile.

7. The method of claim 6, wherein limits on said battery state of charge SOC and charge and discharge of said second life battery are limits of said rule based control.

* * * * *